United States Patent Office 2,856,414
Patented Oct. 14, 1958

2,856,414

OXIDATION OF ALPHA-TOCOPHEROL

Charles D. Robeson and Donald R. Nelan, Rochester, N. Y., assignors to Eastman Kodak Company, Rochester, N. Y., a corporation of New Jersey No Drawing. Application June 19, 1956
Serial No. 592,240

5 Claims. (Cl. 260—396)

This invention is concerned with the oxidation of alpha-tocopherol, and more particularly, to the preparation of alpha-tocopherylquinone and alpha-tocopherylhydroquinone.

It has been reported that alpha-tocopherylquinone and alpha-tocopherylhydroquinone are useful in the treatment of muscular dystrophies and atrophies (The Journal of Biological Chemistry, vol. 183, page 655, 1950). Alpha-tocopherylquinone, sometimes called alpha-tocoquinone, is prepared by a mild oxidation of alpha-tocopherol and is reported to have the following structural formula,

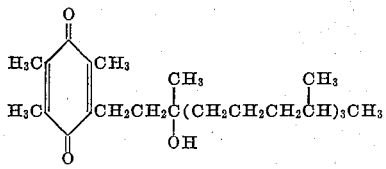

Alpha-tocopherylhydroquinone, sometimes called alpha-tocohydroquinone, is the corresponding reduced form of alpha-tocopherylquinone and is reported to have the following structural formula,

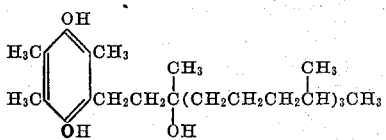

The classical methods for preparing alpha-tocopherylquinone are the oxidations of alpha-tocopherol with gold chloride (Helvetica Chimica Acta, vol. 23, page 455, 1940), or with silver nitrate (Zeitschrift für Physiologische Chemie, vol. 257, page 173, 1939). However, the high cost of the gold chloride and the silver nitrate reactants employed in such oxidation reactions make their use economically unfeasible for commercial application. Ferric chloride has also been proposed as an oxidizing agent for alpha-tocopherol. Reaction mixtures resulting from the oxidation of alpha-tocopherol in the usual manner with ferric chloride are characterized as being comprised of mixtures of several alpha-tocopherol oxidation products, together with unchanged alpha-tocopherol, and of relatively low yields of the desired alpha-tocopherylquinone product. As many as five different reaction products were found in the reaction mixture resulting from a typical oxidation of alpha-tocopherol with ferric chloride (Science, vol. 116, page 34, 1952).

It is thus an object of this invention to provide a new and improved method for oxidizing alpha-tocopherol to alpha-tocopherylquinone.

It is another object of this invention to prepare alpha-tocopherylquinone in high yields by novel methods.

It is also an object of this invention to oxidize alpha-tocopherol under improved reaction conditions so as to produce alpha-tocopherylquinone free of objectionable amounts of other alpha-tocopherol oxidation products.

It is equally an object of this invention to provide an improved method for preparing alpha-tocopherylhydroquinone.

These and other objects are accomplished by reacting alpha-tocopherol with ferric chloride in a two-phase solvent reaction medium in which the alpha-tocopherol is soluble in one phase and the ferric chloride is soluble in the other phase. The resulting alpha-tocopherylquinone oxidation product can thereafter be reduced to alpha-tocopherylhydroquinone.

Any two-phase solvent reaction medium that is substantially inert to alpha-tocopherol and ferric chloride and that is suitable for substantially completely dissolving the alpha-tocopherol in one phase and the ferric chloride in the other phase can be employed. Such a two-phase system is comprised of a relatively non-polar solvent phase and a relatively polar solvent phase. Preferred two-phase systems are mixtures of aqueous lower aliphatic alcohols having 1 to 4 carbon atoms and ethers having boiling points less than about 100° C., typical lower aliphatic alcohols being methanol, ethanol, propanol, iso-propanol and butanol, and typical ethers being diethyl ether, dipropyl ether and diisopropyl ether. The aqueous lower aliphatic alcohol or polar solvent phase is more generally comprised of about 20 to 90% water, a preferred polar phase being 25 to 75% aqueous methanol. Likewise, other related two-phase solvent systems can be utilized in the present invention and include such solvent pairs as aqueous acetic acid and benzene, aqueous acetone and hexane, aqueous methanol and heptane, aqueous methanol and carbon tetrachloride, aqueous acetic acid and petroleum ethers, aqueous acetic acid and ethylenedichloride, and the like, the aqueous phases being the more polar phases in the respective solvent pairs. In accordance with the present invention, the alpha-tocopherol reactant and the alpha-tocopherylquinone oxidation product are substantially completely soluble in the more non-polar phase and the ferric chloride oxidizing agent is substantially completely soluble in the more polar phase of the instant two-phase solvent reaction medium. As used herein, the terms "polar" and "non-polar" with respect to solvents are merely relative terms referring to the differences in polarities between the two substantially immiscible phases comprising the present two-phase reaction media.

The alpha-tocopherol oxidized in accordance with the present invention can be any of the common optical isomers of alpha-tocopherol. Suitable isomeric forms include naturally-occurring d-alpha-tocopherol as well as synthetically prepared racemic mixtures which are commonly denominated "d,l-alpha-tocopherol."

The oxidizing agent utilized in the instant process to convert alpha-tocopherol to alpha-tocopherylquinone is ferric chloride. Ferric chloride commonly occurs as a hydrate containing water of crystallization, such form being commonly termed "ferric chloride hexahydrate." Both the dehydrated and hydrated forms of this oxidizing agent are suitable in the present process. For convenience, the term "ferric chloride" as used herein refers to both of these forms.

Alpha-tocopherylhydroquinone can be prepared by reducing alpha-tocopherylquinone. Eminently suited for effecting this reduction are the hydrosulfite salts, also called "hyposulfite salts," such as the alkali metal hydrosulfites like potassium hydrosulfite, sodium hydrosulfite and the like. Such reducing agents are preferably used as aqueous solutions. The hydrides, such as lithium aluminum hydride, sodium borohydride, potassium borohydride, and the like, are also suitable reducing agents. Likewise, hydrogen in the presence of a suitable hydrogenation catalyst such as palladium on a carbon or calcium carbonate carrier can be utilized in this reduction step.

The present process can be effected by dissolving alpha-tocopherol in a relatively non-polar solvent and adding thereto ferric chloride dissolved in a relatively polar solvent. The solvents for the alpha-tocopherol and ferric chloride respectively are chosen so that on admixture, two distinct and substantially immiscible phases separable by decantation, to wit, by pouring, syphoning or the like, are formed. The volumetric proportion of the relatively non-polar phase to the polar phase is not important to the present process. The resulting two-phase mixture is thereafter allowed to react until substantially all of the alpha-tocopherol has been oxidized to alpha-tocopherylquinone. The degree of oxidation of the alpha-tocopherol can be readily determined by Emmerie and Engel assay and ultra-violet absorption. This oxidation can be effected in a single reaction, or by a series of reactions by allowing the reaction mixture to separate into two phases before all of the alpha-tocopherol has been converted to alpha-tocopherylquinone, separating and discarding the relatively polar phase and adding an additional portion of ferric chloride in a relatively polar solvent. Such a series of steps can be repeated until substantially all of the alpha-tocopherol has been oxidized to alpha-tocopherylquinone. As the reaction medium is a two-phase system, the reaction is preferably effected with agitation, such as with mechanical stirring or shaking. This reaction can be suitably and conveniently effected at about room temperature, although elevated temperatures can be used to facilitate the reaction and reduce the reaction time. Typical reaction periods for the instant oxidation reaction usually range from about 1 hour to about 4 hours, although shorter reaction periods are frequently suitable. Likewise, reaction periods as long as about 24 hours may be desired to convert substantially all of the alpha-tocopherol to alpha-tocopherylquinone. The reaction time varies with such factors as the degree of agitation of the reaction mixture, the temperature of the reaction, the nature of the solvent pair employed, and similar reaction variables. As light appears to catalyze or promote the destruction of alpha-tocopherylquinone, the reaction is preferably effected in total darkness or in subdued light. The alpha-tocopherylquinone product is in solution in the relatively non-polar phase of the two-phase reaction system and can be readily separated from the reaction mixture by decanting off the relatively polar phase and removing the remaining relatively non-polar solvent from the product by evaporation, distillation or by similar well-known means of separation. Such an oxidation process of alpha-tocopherol to alpha-tocopherylquinone can be effected in substantially quantitative yields without the formation of the sundry oxidation products resulting from other known methods.

The resulting alpha-tocopherylquinone can thereafter be readily reduced to alpha-tocopherylhydroquinone. Any of the above-described reducing agents can be employed. The reduction is preferably effected in a two-phase reaction system such as employed in the above-described oxidation of alpha-tocopherol to alpha-tocopherylquinone, the alpha-tocopherylquinone reactant and the resulting alpha-tocopherylhydroquinone reduction reaction product being substantially completely dissolved in the relatively non-polar phase and the reducing agent being substantially completely dissolved in the relatively polar phase. However, such a two-phase reaction system need not be employed in this reduction reaction, particularly when hydrogen, in the presence of a suitable hydrogenation catalyst, is used as the reducing agent. Sufficient reaction time and sufficient reducing agent are employed to reduce substantially all of the alpha-tocopherylquinone to alpha-tocopherylhydroquinone. The degree of reduction can be determined by Emmerie and Engel assay and by ultra-violet absorption. This reduction reaction is also preferably effected in total darkness or in subdued light to reduce undesirable light-catalyzed side reactions in the reaction mixture.

Alpha-tocopherylhydroquinone can be stabilized against oxidative destruction with antioxidants and reducing agents. Typical stabilizing materials that can be suitably employed are butylated hydroxy anisole, citric acid, gluconic acid, ascorbic acid, butylated hydroxy toluene, ethylenediamine tetra-acetic acid, glycine, lysine, acetylacetone, $\beta$-hydroxyquinoline, dimethylgloxime, sodium bisulfite, stannous chloride, formaldehyde, hydrazine, hydroxylamine, and the like, or admixtures thereof.

The complete process of oxidizing alpha-tocopherol to alpha-tocopherylquinone and thereafter reducing this latter material to alpha-tocopherylhydroquinone can be effected in the same reactor without subjecting the respective reactants and reaction products to light or to the air. Also, the relatively non-polar solvent used to dissolve the alpha-tocopherol reactant need not be removed after the ferric chloride oxidation step and can be utilized in the reaction medium for the alpha-tocopherylquinone reduction step. Such reactions are preferably effected in an inert atmosphere, such as in a closed reactor under nitrogen. Thus, such a process for converting alpha-tocopherol to alpha-tocopherylhydroquinone is particularly suited for commercial operations as losses due to excessive handling and exposure to air and light of the sensitive reactants and reaction products are significantly minimized.

As used herein, the term "alpha" is equivalent to the Greek letter "$\alpha$."

The invention is further illustrated by the following examples of preferred embodiments thereof, it being understood that the examples are illustrative only and are not intended to limit the scope of the invention unless otherwise specifically indicated.

*Example 1*

To a sphere-shaped separatory funnel equipped with a stirrer and containing 100 g. of substantially pure alpha-tocopherol derived from soybean oil, having $$E_{1\,cm.}^{1\%}(292\ m\mu) = 75.8$$

and dissolved in one liter of diethyl ether, was added 250 ml. of about 50% aqueous methanol containing dissolved therein 33 g. of ferric chloride hexahydrate. The resulting mixture was vigorously stirred at room temperature for about 30 minutes and allowed to separate into two liquid phases. The lower aqueous methanol phase was thereafter drawn off and discarded. The steps of adding 250 ml. portions of aqueous methanol and ferric chloride hexahydrate, vigorously stirring and drawing off the lower methanol phase were thereafter repeated five more times as described above. The resulting diethyl ether phase was thereafter washed three times with 250 ml. portions of water, dried over anhydrous sodium sulfate, filtered and the diethyl ether removed by distillation under vacuum to give 103.5 g. of a yellow oil (alpha-tocopherylquinone) having $$E_{1\,cm.}^{1\%}(269\ m\mu) = 422$$

For a purity of 98.3% and containing only 0.38% residual alpha-tocopherol as determined by Emmerie and Engel assay. Thus, the conversion of alpha-tocopherol to alpha-tocopherylquinone was substantially quantitative. The above-described reaction, phase-separation and washing steps were effected under subdued light by employing an opaque cloth around the separatory funnel used in these steps. In a similar manner, a 10 g. sample of substantially pure alpha-tocopherol was oxidized to alpha-tocopherylquinone in a solvent medium comprised of 100 ml. of petroleum ether (boiling range 30–60° C.) and five successive 30 ml. portions of 50% aqueous acetic acid containing 4 g. of ferric chloride hexahydrate dissolved in each portion.

Example 2

A 100 g. sample of substantially pure alpha-tocopherol derived from soybean oil, and having $$E_{1\ cm.}^{1\%}(292\ m\mu) = 75.8$$

was oxidized to alpha-tocopherylquinone in the manner described in detail in Example 1 except that one liter of diisopropyl ether was employed in lieu of one liter of diethyl ether as the solvent for the alpha-tocopherol and the alpha-tocopherylquinone reaction product, the diisopropyl ether solvent not being removed from the resulting alpha-tocopherylquinone after the water washings. To the diisopropyl ether solution of alpha-tocopherylquinone in the separatory funnel was added 350 ml. of an aqueous solution containing 50 g. of sodium hydrosulfite. The resulting mixture was thereafter vigorously stirred at room temperature for about 30 minutes and the reaction mixture allowed to separate into two liquid phases. The lower aqueous phase was thereafter drawn off and discarded. The steps of adding 250 ml. portions of an aqueous solution of sodium hydrosulfite, vigorously stirring and drawing off the lower aqueous phase were thereafter repeated three times. The resulting diisopropyl ether phase was thereafter washed with a 400 ml. portion of water, dried over anhydrous sodium sulfate, filtered and the diisopropyl ether removed by distillation under vaccum. The resulting residue of alpha-tocopherylhydroquinone weighed 105.8 g., was 97.6% pure as determined by Emmerie and Engel assay and had $$E_{1\ cm.}^{1\%}(287\ m\mu) = 62.6$$

The overall yield for the conversion of alpha-tocopherol to alpha-tocopherylhydroquinone was about 99%. The above-described reaction, phase-separation and washing steps were effected under subdued light by employing an opaque cloth around the separatory funnel used in these steps.

Example 3

To 1.42 g. of alpha-tocopherylquinone prepared in an aqueous methanol and diethyl ether solvent medium in accordance with the method described in Example 1 was added 20 ml. of ethanol and .16 g. of catalyst material comprised of 8% palladium on a calcium carbonate carrier. The resulting mixture was shaken in a glass-stoppered, 100 ml., red flask with hydrogen for 90 minutes. About .0032 mole of hydrogen (at a temperature of 25° C. and a pressure of 75.7 mm. of mercury) were taken up by the alpha-tocopherylquinone to reduce it to alpha-tocopherylhydroquinone. Thereafter, the catalyst material was centrifuged from the reaction mixture. Also, the ethanol was removed by distillation under vacuum to yield alpha-tocopherylhydroquinone.

Accordingly, the present process provides an efficient, high-yielding method for preparing the biologically useful materials, alpha-tocopherylquinone and alpha-tocopherylhydroquinone. Further, the numerous alpha-tocopherol oxidation products which contaminate alpha-tocopherylquinone compositions prepared by oxidation of alpha-tocopherol with ferric chloride in the usual manner are not produced in significant amounts by the instant two-phase process. Also, this two-phase oxidation process can be effected without the relatively expensive reactants, gold chloride and silver nitrate, used in prior art processes.

Although the invention has been described in considerable detail with reference to certain preferred embodiments thereof, it will be understood that variations and modifications can be effected within the spirit and scope of the invention as described hereinabove and as defined in the appended claims.

We claim:

1. In a method of producing alpha-tocopherylquinone in which alpha-tocopherol is reacted with ferric chloride in an inert reaction medium; the improvement in which the alpha-tocopherol is separately dissolved is a relatively non-polar solvent, the ferric chloride is separately dissolved in a relatively polar solvent which forms a two-phase solvent reaction medium when mixed with said non-polar solvent, and the separate solutions are thereafter mixed to permit the ferric chloride to react with the alpha-tocopherol, whereby the oxidation of the alpha-tocopherol to alpha-tocopherylquinone takes place in the resulting two-phase solvent reaction medium.

2. In a method of producing alpha-tocopherylquinone in which alpha-tocopherol is reacted with ferric chloride in an inert reaction medium; the improvement in which the alpha-tocopherol is separately dissolved in an aliphatic ether having a boiling point of less than about 100° C., the ferric chloride is separately dissolved in an aqueous lower aliphatic alcohol which forms a two-phase solvent reaction medium when mixed with said aliphatic ether, and the separate solutions are thereafter mixed to permit the ferric chloride to react with the alpha-tocopherol, whereby the oxidation of the alpha-tocopherol to alpha-tocopherylquinone takes place in the resulting two-phase solvent reaction medium.

3. A process as defined in claim 2 wherein the two-phase solvent reaction medium is comprised of aqueous methanol and diethyl ether.

4. A process as defined in claim 2 wherein the two-phase solvent reaction medium is comprised of aqueous methanol and di-isopropyl ether.

5. A process as defined in claim 2 wherein the aqueous lower aliphatic alcohol is about 25 to 75% aqueous methanol.

References Cited in the file of this patent

Boyer: J. Am. Chem. Soc., vol. 73, pages 733–740 (1951).